US009685016B2

(12) United States Patent
Randolph et al.

(10) Patent No.: US 9,685,016 B2
(45) Date of Patent: Jun. 20, 2017

(54) SYSTEM AND METHOD FOR PROVIDING ACCESS TO A DEFINED SPACE

(71) Applicants: Ronald Randolph, Southfield, MI (US); Douglas Weldon, East Point, GA (US); Tony Randolph, W. Bloomfield, MI (US)

(72) Inventors: Ronald Randolph, Southfield, MI (US); Douglas Weldon, East Point, GA (US); Tony Randolph, W. Bloomfield, MI (US)

(73) Assignee: Virtual Guest Services, LLC, Clawson, MI (US)

( * ) Notice: Subject to any disclaimer, the term of this patent is extended or adjusted under 35 U.S.C. 154(b) by 0 days.

(21) Appl. No.: 14/941,185

(22) Filed: Nov. 13, 2015

(65) Prior Publication Data

US 2017/0140588 A1    May 18, 2017

(51) Int. Cl.
*G07C 9/00* (2006.01)
*H04L 29/06* (2006.01)
*G07B 15/00* (2011.01)

(52) U.S. Cl.
CPC ..... *G07C 9/00166* (2013.01); *G07C 9/00087* (2013.01); *G07C 9/00126* (2013.01); *G07C 9/00158* (2013.01); *H04L 63/083* (2013.01); *H04L 63/102* (2013.01); *G07B 15/00* (2013.01)

(58) Field of Classification Search
CPC ............ G07C 9/00087; G07C 9/00158; G07C 9/00166; H04N 7/18; G06K 9/00; G08G 1/017; H04L 12/2801; H04L 63/083; H04L 63/102; G07B 15/00
USPC ......... 340/937, 5.7, 715, 149, 147; 348/143, 348/159, 152; 382/105, 104, 100, 103; 701/519
See application file for complete search history.

(56) References Cited

U.S. PATENT DOCUMENTS

| 6,504,479 | B1 * | 1/2003 | Lemons ............ | G07C 9/00087 340/430 |
| 6,513,119 | B1 * | 1/2003 | Wenzel ............. | G07C 9/00158 340/5.8 |
| 8,254,631 | B2 * | 8/2012 | Bongard ................ | G07B 15/00 348/143 |
| 8,558,887 | B2 | 10/2013 | Plaster | |

* cited by examiner

*Primary Examiner* — Ali Neyzari
(74) *Attorney, Agent, or Firm* — Simonelli IP, PLLC

(57) ABSTRACT

A method provides a guest access to a defined space selectively accessible through an automated gate. The method includes the steps of causing a resident interface to be displayed to a resident via a resident data device. Guest data is received from the resident about the guest using the resident data device. The guest data is transmitted to a central station. The guest identifies when the guest arrives at the automated gate. The method also opens the automated gate to allow the guest to travel into the defined space after the automated gate is opened.

5 Claims, 14 Drawing Sheets

SYSTEM AND METHOD FOR PROVIDING ACCESS TO A DEFINED SPACE

BACKGROUND ART

1. Field of the Invention

The invention relates to a system and method for providing access to a defined space. More particularly, the invention relates to controlling the ability for people to enter a defined space, such as a gated community.

2. Description of the Related Art

Gated communities include marinas, exclusive neighborhoods, housing complexes, and the like. Gated communities are designed to protect those that are within the community. They are also designed to identify those that are visiting the community and to prevent those that are not welcome from entering the community.

This is particularly important in the marina environment when there are so many assets of high value that are within a particular piece of property. Heightening the issues around a marina include the fact that the valuable assets are in water and any damage done to a watercraft may increase the damages exponentially if a breach were to occur in a manner to allow water to enter the watercraft. Also, those that own or control marinas do not want people on the property that are not authorized due to the fact a slip and fall may result in a drowning, especially if no one knows that that person is in the marina.

A solution to these problems has been to gate the community with a guard that watches over the gate. With the guard identifying the guest or contacting a resident to authorize the guest, the guest stays at the gate until authorized. This is a time consuming process. In addition, it is a labor intensive process with a guard being required to be on staff 24 hours a day.

SUMMARY OF THE INVENTION

A method provides a guest access to a defined space selectively accessible through an automated gate. The method includes the steps of causing a resident interface to be displayed to a resident via a resident data device. Guest data is received from the resident about the guest using the resident data device. The guest data is transmitted to a central station. The guest identifies when the guest arrives at the automated gate. The method also opens the automated gate to allow the guest to travel into the defined space after the automated gate is opened.

BRIEF DESCRIPTION OF THE DRAWINGS

Advantages of the invention will be readily appreciated as the same becomes better understood by reference to the following detailed description when considered in connection with the accompanying drawings, wherein.

DETAILED DESCRIPTION OF THE PREFERRED EMBODIMENT

Figure 1:
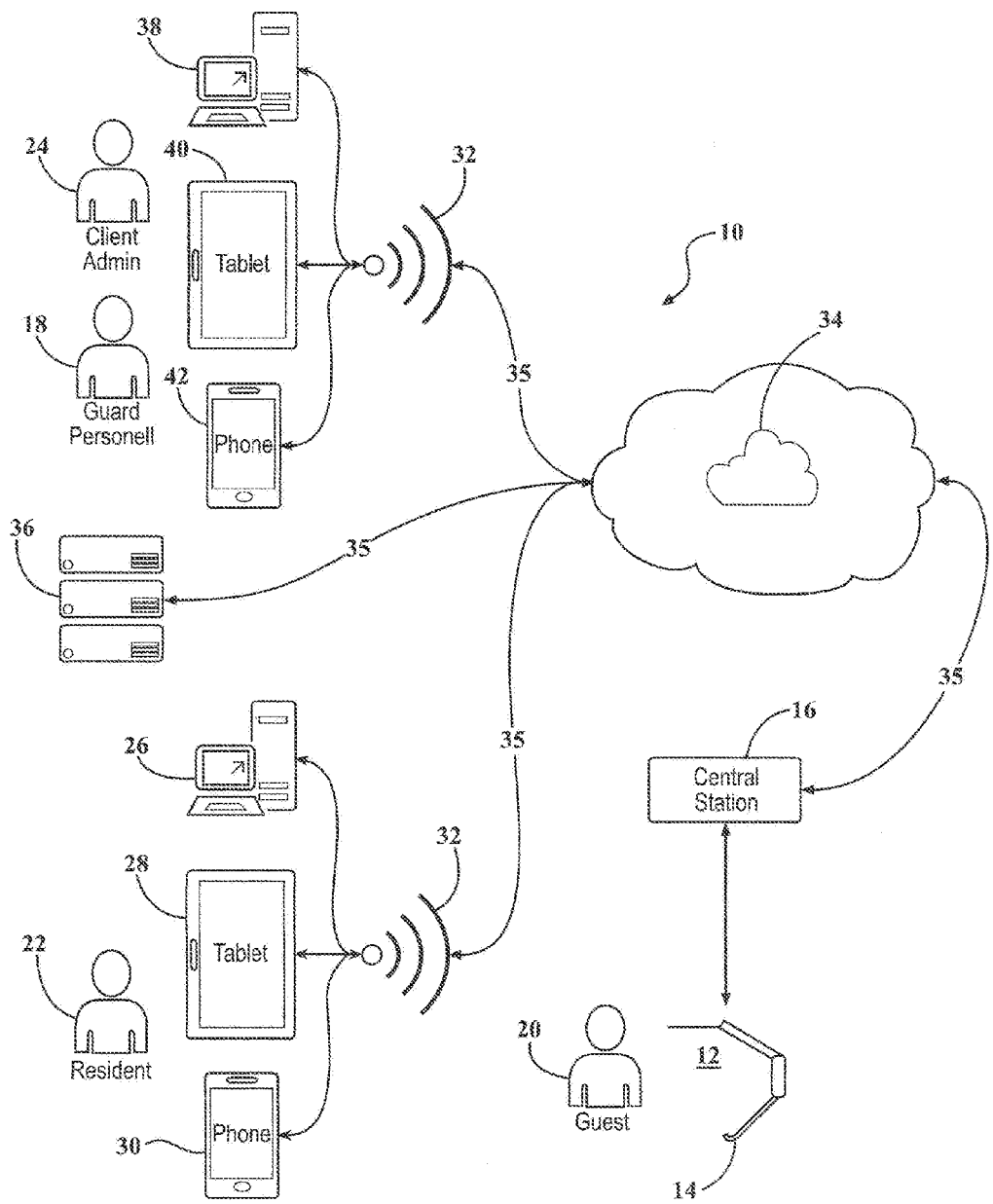
FIG. 1 is a schematic view of one embodiment of a system incorporating the inventive method.
Figure 2:
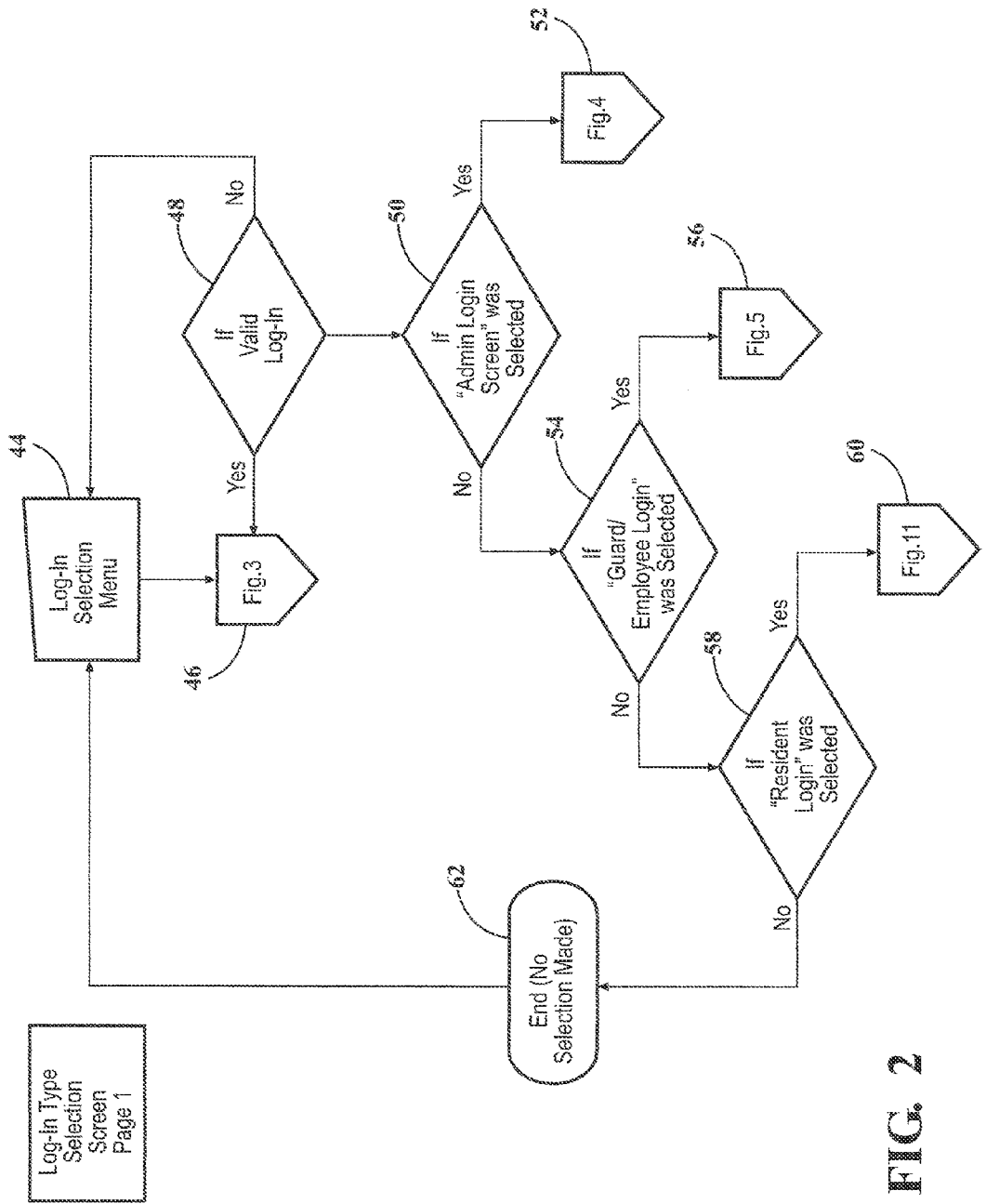
FIGS. 2 through 13 are flow charts of one embodiment of the inventive method.

Referring to FIG. 1, the system that controls access is generally indicated at 10. A defined space 12 is disposed behind an automated gate 14. The automated gate 14 is controlled by a central station 16. In some instances, guard personnel 18 are employed to occupy the central station 16 to facilitate the operation of the system 10. It may be appreciated by those skilled in the art that the central station 16 may include devices for two-way communication (not shown), such as a landline telephone or an intercom system to further enhance the capabilities of the system 10 by providing communication between a guest 20, a resident 22, the guard 18 and any client administration 24. The resident 22 may communicate with the system 10 through a personal computer 26, a tablet 28 and/or a smart phone 30. These devices may communicate wirelessly, as graphically illustrated by the arcuate waves 32 to the cloud 34 via the internet 35.

A server 36 remotely operates the system 10. The server 36 is connected to the cloud 34 via the internet 35.

Both the client administration 24 and guard personnel 18 also communicate with the server 36 and the central station 16 through the cloud 34 via the internet 35 wirelessly as graphically illustrated by the wireless waves 32. As with the resident 22, the client administrator 24 and the guard personnel 18 may communicate with the server 36 and the central station 16 through the cloud 34 using a computer 38, a tablet 40 and/or a smart phone 42. It should be appreciated by those skilled in the art that any smart device, stationary, portable or wearable, that is capable of communicating to the cloud 34 over the internet 35 is capable of being used by any party 18, 20, 22, 24 utilizing the system 10 for the purposes of controlling access of a defined space 12 to a guest 20.

Referring to FIGS. 2 through 12, the flow charts relating to the method of operating the system 10 are set forth. Beginning with FIG. 2, the log-in selection menu begins at 44. The method immediately moves to the flowchart in FIG. 3 at 46 to enter a valid email address and password, the subroutine for which will be described in greater detail subsequently. Upon return from FIG. 3, it is determined if the log-in is valid at 48. If it is not, the method returns to the log-in selection menu at 44. If the log-in is determined to be valid, it is determined if the "Admin Log-in" screen was selected at 50. If so, the method moves to FIG. 4 at 52. If not, it is determined whether the "Guard/Employee Log-in" screen was selected at 54. If yes, the method moves to FIG. 5 at 56. If not, it is determined whether the "Resident Log-in" screen was selected at 58. If so, the method moves to FIG. 11 at 60. If not, it is determined at 62 that no selection has been made and the method returns to the main log-in selection menu at 44.

Figure 3A:
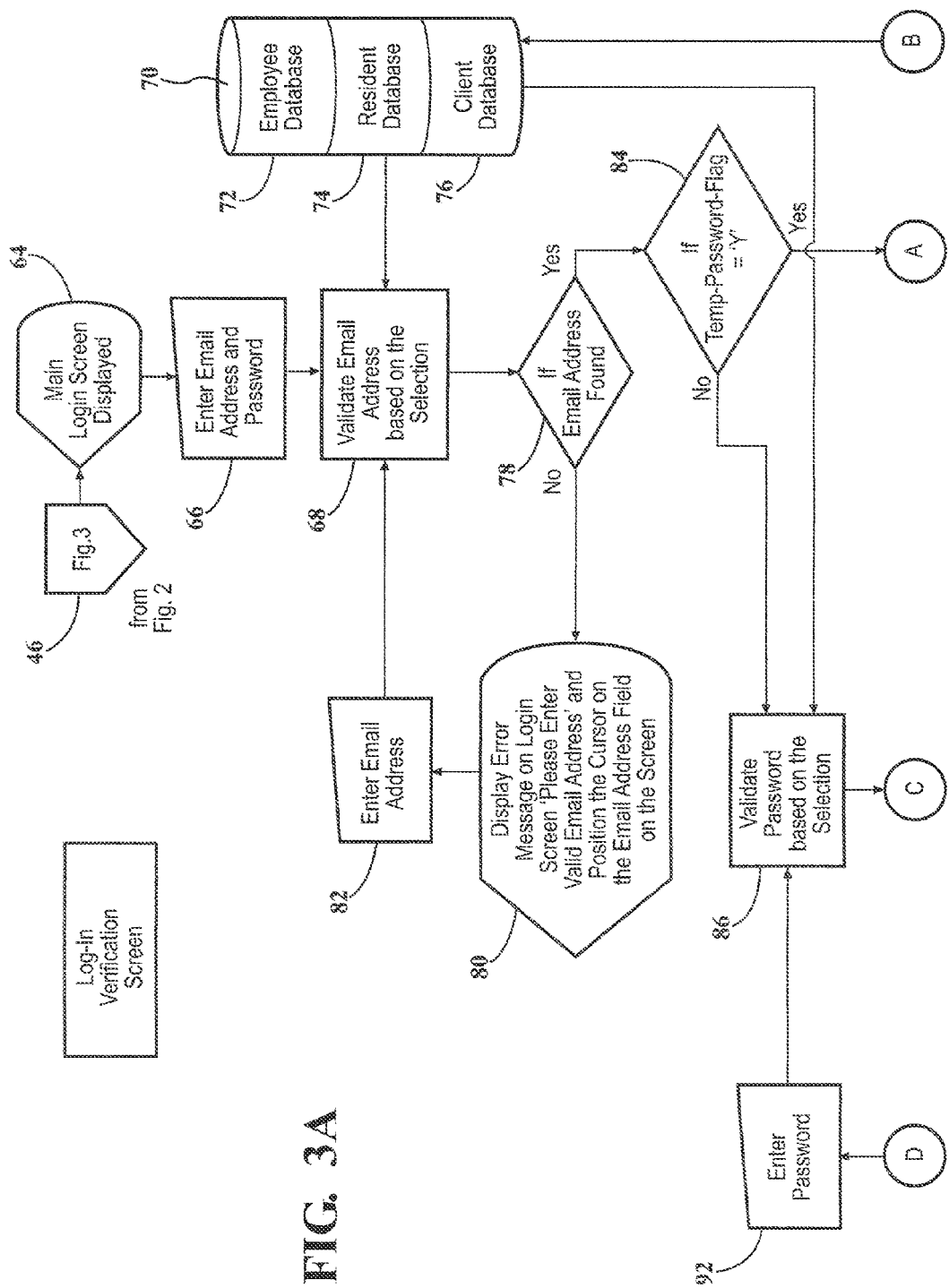
Figure 3B:
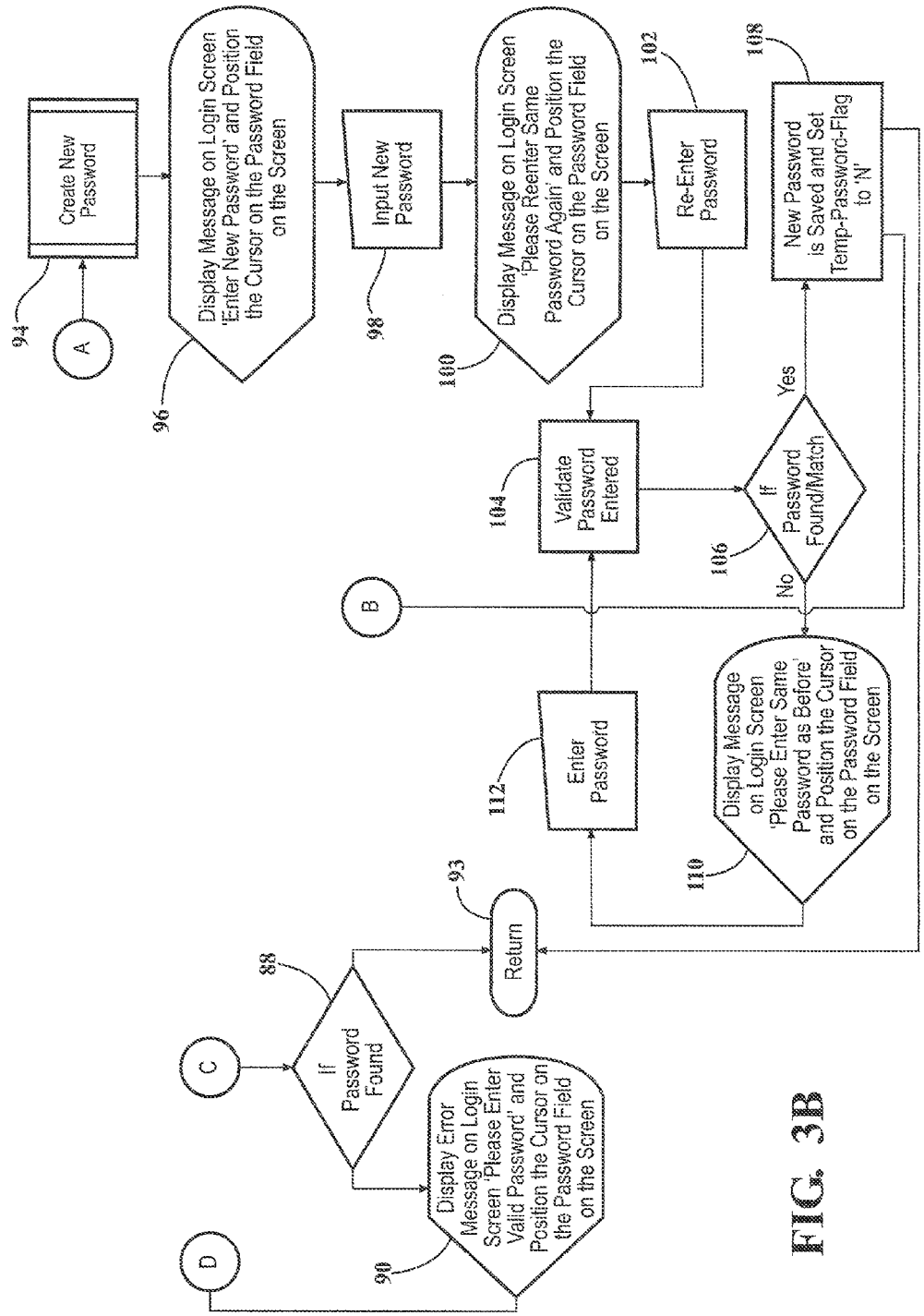

Turning attention to the log-in verification subroutine shown in FIG. 3, the main log-in screen is displayed at 64. An email address and password are entered at 66. The email address is validated at 68 by comparing it to the email addresses stored in a system database, generally shown at 70. The system database 70 consists of an employee database 72, a resident database 74 and a client database 76. The employee database 72 stores the information of the employees, such as guards and staff, that manage the defined space 12. The resident database 74 stores the information of those parties that own or rent property, real or personal, which exists or is stored within the defined space 12. The client database 76 stores the information of those individuals that own the defined space 12.

It is then determined whether the email address was found at 78. If the email address was not found, an error message is displayed at 80 and the opportunity to enter the email address is again provided at 82, after which the method loops back to the validation step 68.

If the email address is found, it is determined whether a password has been assigned to the email address at 84. If there is a password, it is compared against the system database 70 to determine if it is a valid password. If the password is not found, 88, an error message is displayed at 90 and a new password can be entered at 92. If the password is found, the method returns at 93 to the log-in selection method to determine if a valid log-in has occurred at 48 in FIG. 2.

If, at 84, the temporary password flag is set, the method enters a subroutine to create a new password at 94. A message prompt at 96 indicates that a new password should be entered. A new password is entered at 98, a message is displayed at 100 to reenter the new password and the new password is reentered at 102. The password is validated by reentry thereof at 104.

If a password match is found at 106, the new password flag is turned off at 108. The method then returns at 93 to the valid log-in routine at 48 in FIG. 2. If a password match is not found at 106, a message prompting the user to input the password again is displayed at 110. The password is then entered again at 112 and it is determined at 104 whether the password entered was validated.

Now that the email and password have been entered and validated (at 48 in FIG. 2), it is determined at 50 whether the administration log in screen was selected. If so, we turn to FIG. 4 at 52. The admin main menu screen is displayed at 120. It is then determined at 122 whether the admin set up screen was selected. If not, it is determined whether the search screen was selected at 124. If not, it is determined whether the resident set up screen was selected at 126. If not, it is then determined whether the guard/employee set up screen was selected at 128. If not, it is then determined whether the guard/employee screen was selected at 130. If not, it is determined whether the monthly report screen is selected at 132. If that screen was not selected, then the subroutine is ended at 134 and loops back to display the admin main menu screen at 120.

Figure 12:
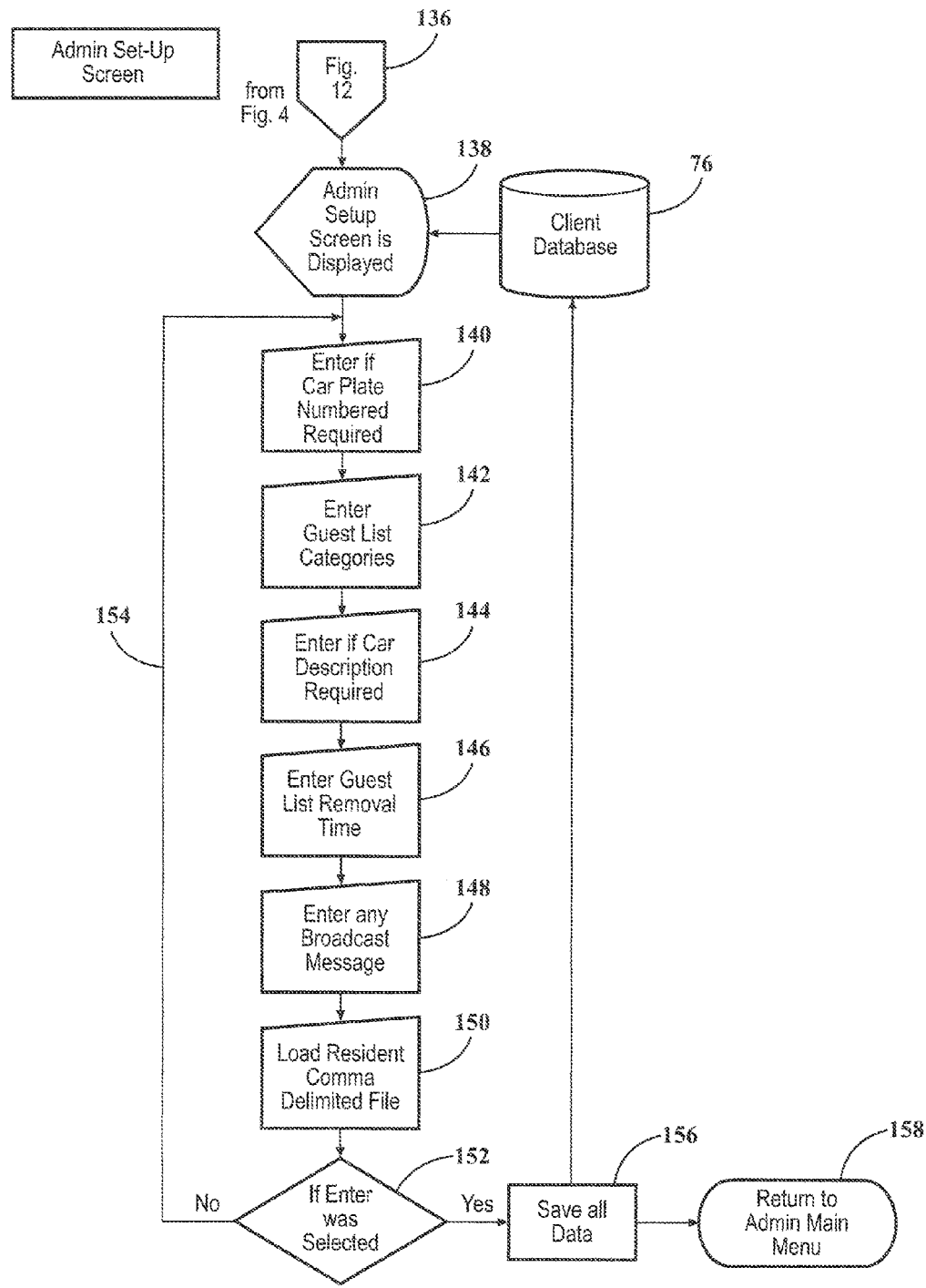

Returning our attention to the opportunity to select the admin set up screen at 122, a yes selection at 136 opens the admin set-up screen subroutine found in FIG. 12. The admin set up screen is displayed at 138. A car license plate is entered at 140. A guest list categories is entered at 142. A car description is entered at 144. And a guest list removal time is entered at 146. If a broadcast message to be entered, it is done so at 148. A resident file is loaded at 150. It is contemplated that the information that was entered would be reviewed at this time on the admin set up screen. If the final entry is not selected at 152, the subroutine loops back at 154 back to entering the car license plate at 140. If enter was selected at 142, all of the data is saved at 156 and the subroutine returns to the admin main menu at 158. If all of the data is saved, it is saved in the client database 76.

Figure 10:
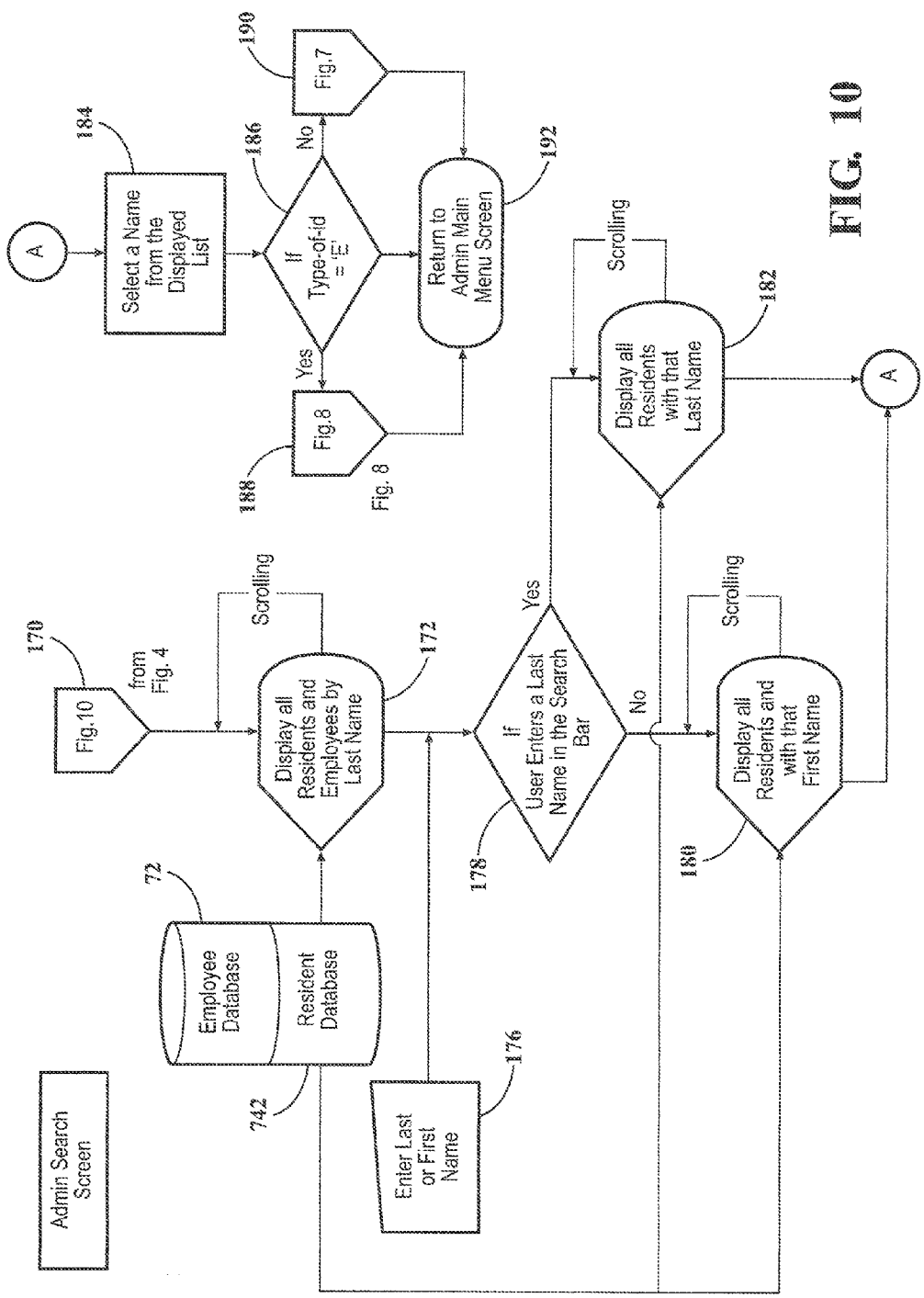

Returning to the admin main menu (FIG. 4), if it is determined that the search screen was selected at 124, the method turns to the admin search screen subroutine at 170, which is shown in FIG. 10. To search, a user may scroll through all of the resident and employee entries by last name at 172. The scrolling loop 174 is facilitated by obtaining the last names of the employees and the residents by searching the employee database 72 and resident database 74, respectively. If a particular name is to be searched, it is entered at 176. It is then determined at 178 whether the user enters a last name in the search bar. If not, a scrolling display of residents with the first name is shown at 180. If the last name was entered at 178, a scrolling display of residents by the last name is shown at 182. The user then has the opportunity at 184 to select a name from the displayed list. It is then determined whether the type of ID equals an employee at 186. If it does, the subroutine moves to FIG. 8 at 188. If not, then it is determined that the name is a resident and the method moves to the resident set up screen subroutine found on FIG. 7 at 190. When the employee set up screen or the resident set up screen subroutines are completed the method returns to the administrative main menu screen of FIG. 4 at 192.

Figure 8:
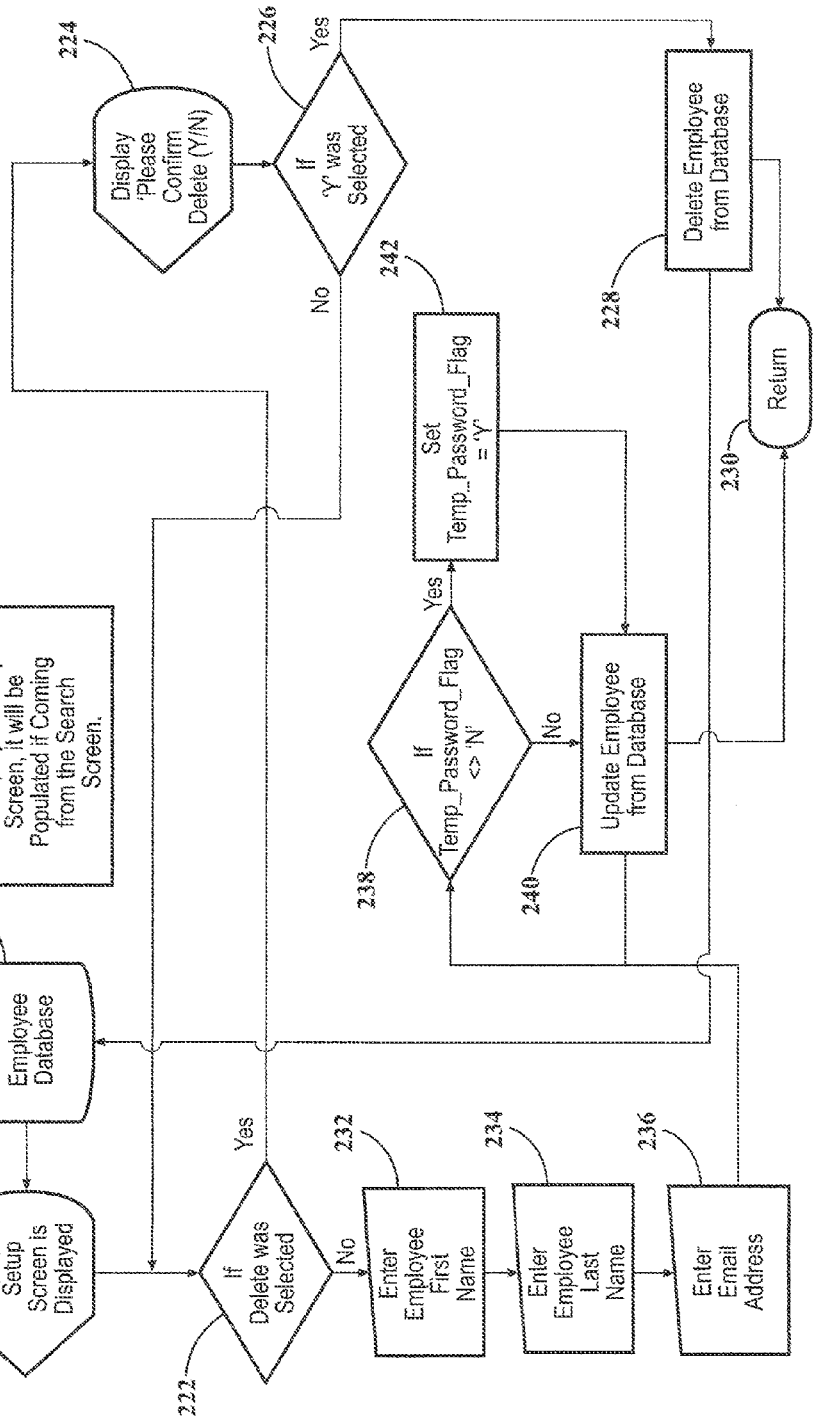
Figure 9:
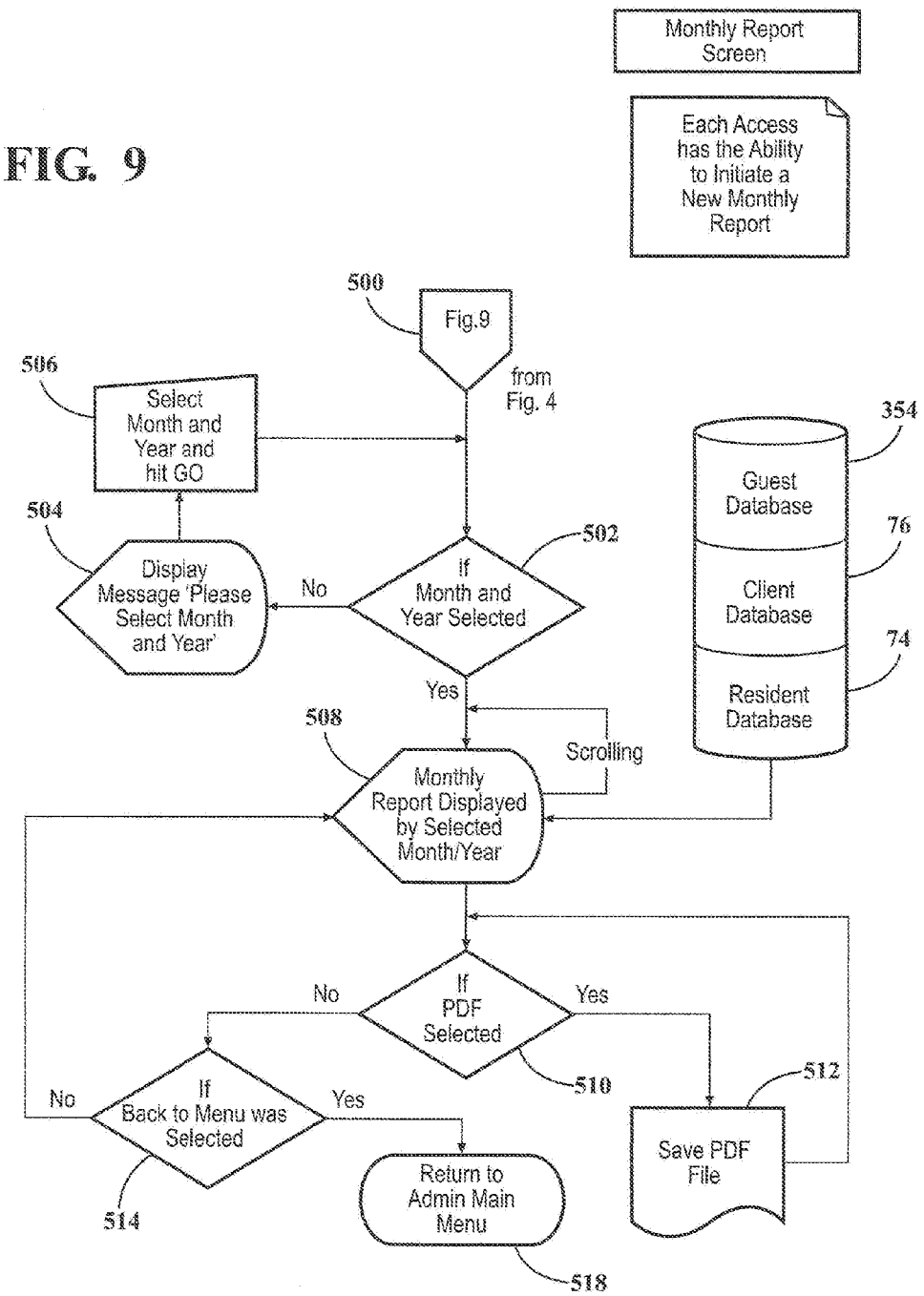

Turning our attention to FIG. 8, the employee set up screen is displayed at 220. It is then determined at 222 whether the delete key was selected. If so a request for confirmation to delete an entry is shown at 224. If yes was selected at 226, then the entry from the employee database 72 is deleted at 228 and the method returns at 230. The deletion is also recorded in the employee database 72.

If delete was not selected at 222, the employee first name is entered at 232 and the employee last name is entered at 234. An email address is entered at 236, then the temporary password flag is turned on at 238. The employee database 72 is updated at 240 and the subroutine returns at 230.

Figure 7:
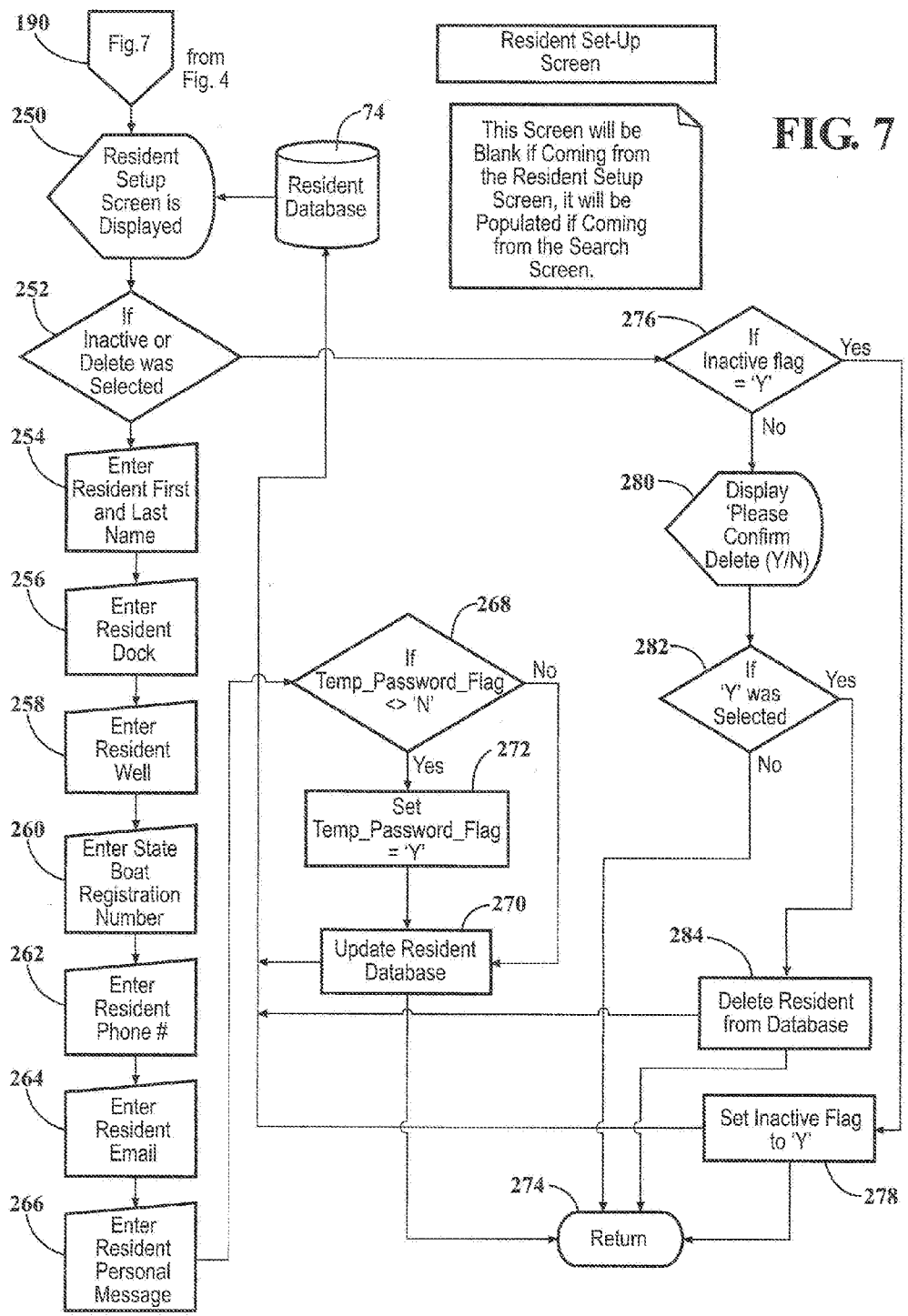

Referring to FIG. 7, the resident set up screen is displayed at 250 after coming from admin search screen of FIG. 10. It is determined whether inactive or delete was selected at 252. If not, a resident first and last name is entered at 254. In the instance the defined space 12 is a marina, a resident dock number is entered at 256, a resident well is entered at 258 and a resident water craft state registration number is entered at 260. A resident phone number is entered at 262 and the resident email address is entered at 264. If a personal message is to be entered, it is done so at 266. Then, the temporary password flag is turned on at 272 the resident database 74 is updated at 270. The subroutine is then returned to the admin search screen subroutine of FIG. 10 at 274.

If, however, the inactive or delete was selected at 252, it is determined whether the inactive flag was set at 276. If so, the inactive flag is set at 278 and the subroutine is returned at 274 to the admin search screen subroutine of FIG. 10. If the inactive flag was not set, it is then displayed at 280 to confirm that the resident entry is to be deleted. If yes is selected at 282, the resident is deleted from the database at 284 and the resident database 74 is updated. If no is selected, the subroutine returns at 274 to the admin search screen subroutine of FIG. 10.

Figure 4:
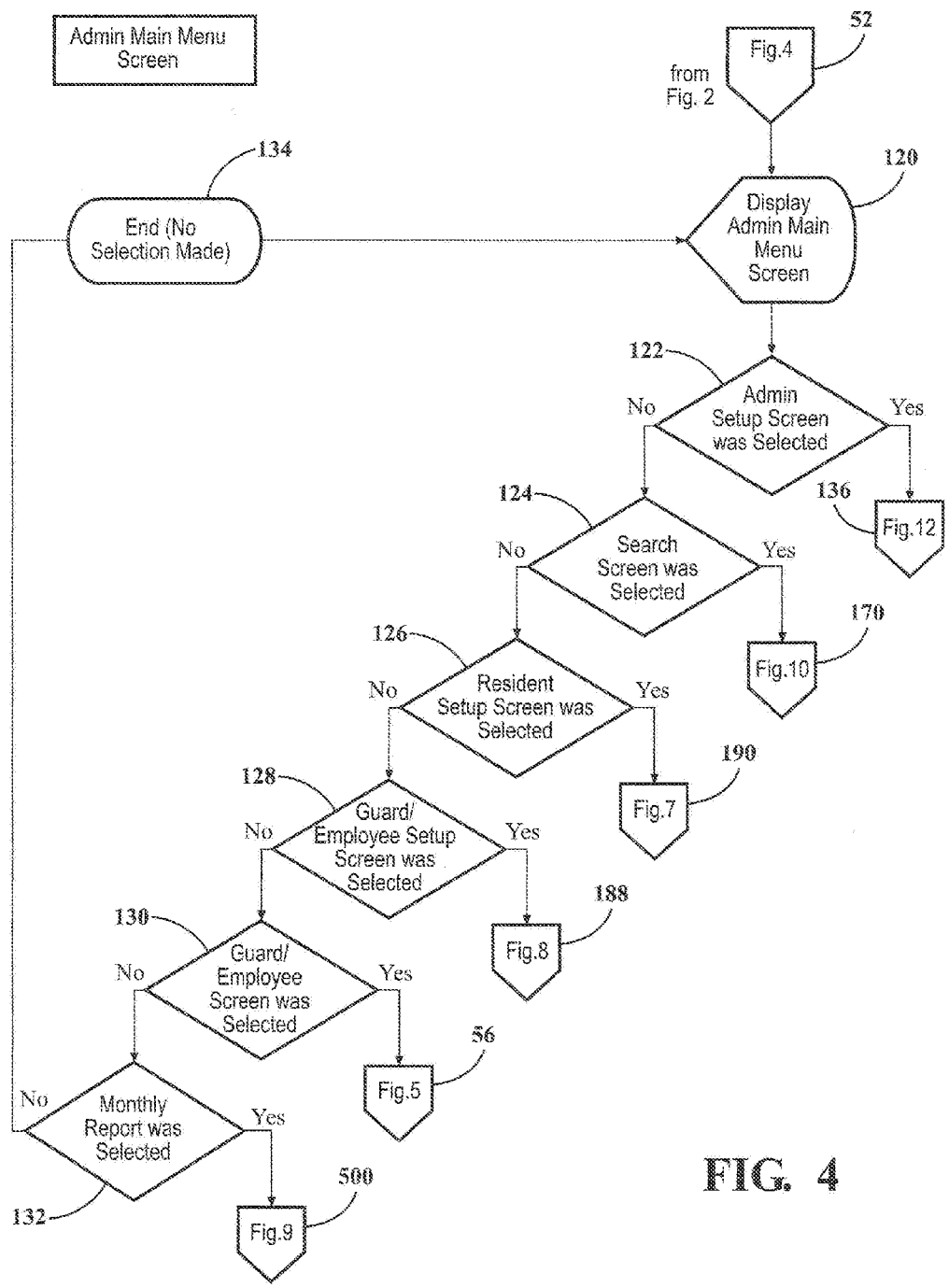
Figure 5:
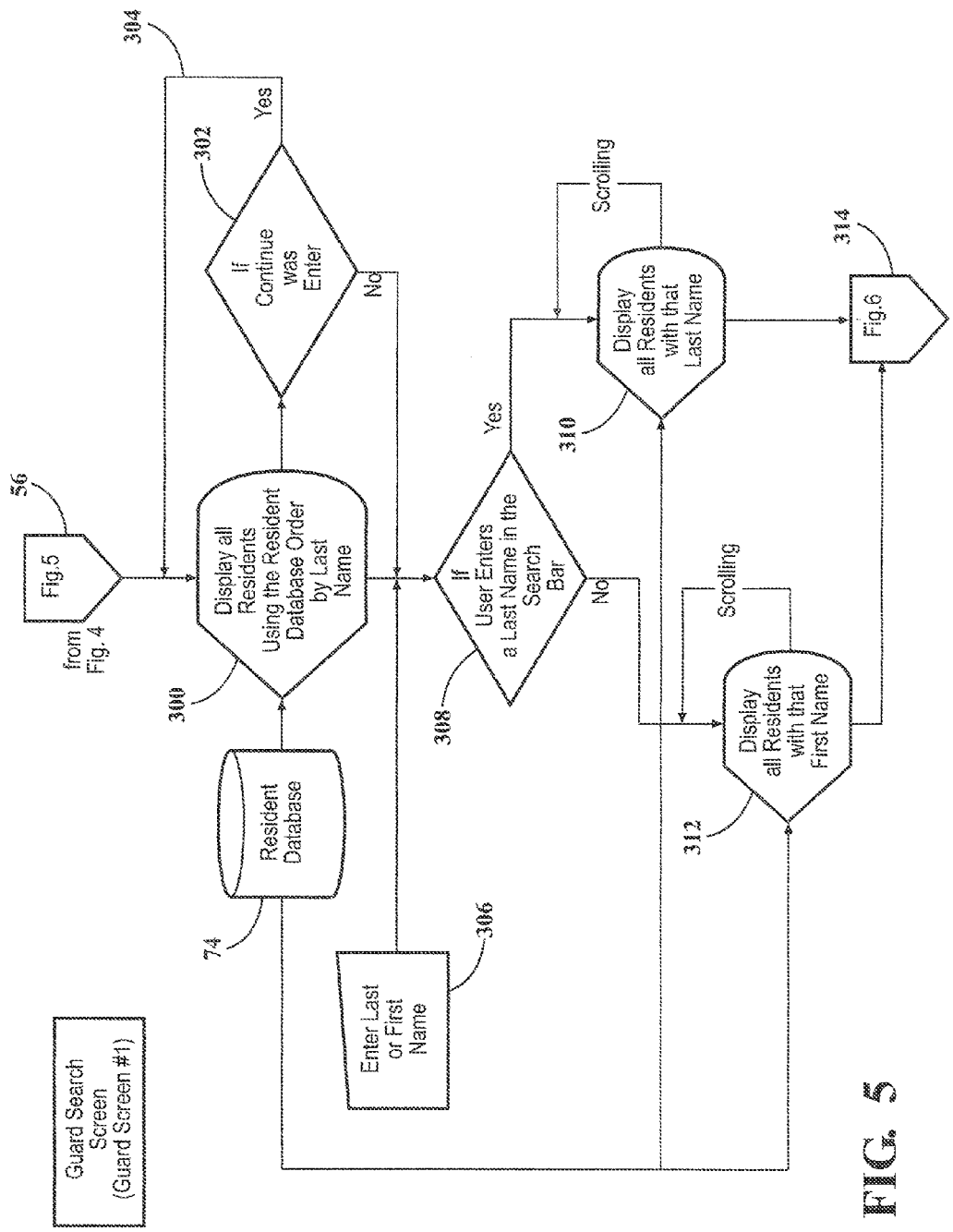

Returning attention to FIG. 4, if the guard/employee screen was selected at 130, the method moves to FIG. 5 for a guard screen subroutine at 56. The guard search screen allows the guard to display all residents using the residents database 74 at 300. It is then determined whether continue was entered at 302. If so, the subroutine loops back at 304 to display more residents at 300 using the resident database 74. If continue was not entered, a first and last name is entered at 306. It is then determined whether the user entered a last name in the search name at 308. If so, the residents last names are displayed in a scrolling manner at 310. If not, the residents names are displayed using the first name in a scrolling manner at 312. The subroutine then moves to the guard screen subroutine of FIG. 6 at 314.

Figure 6:
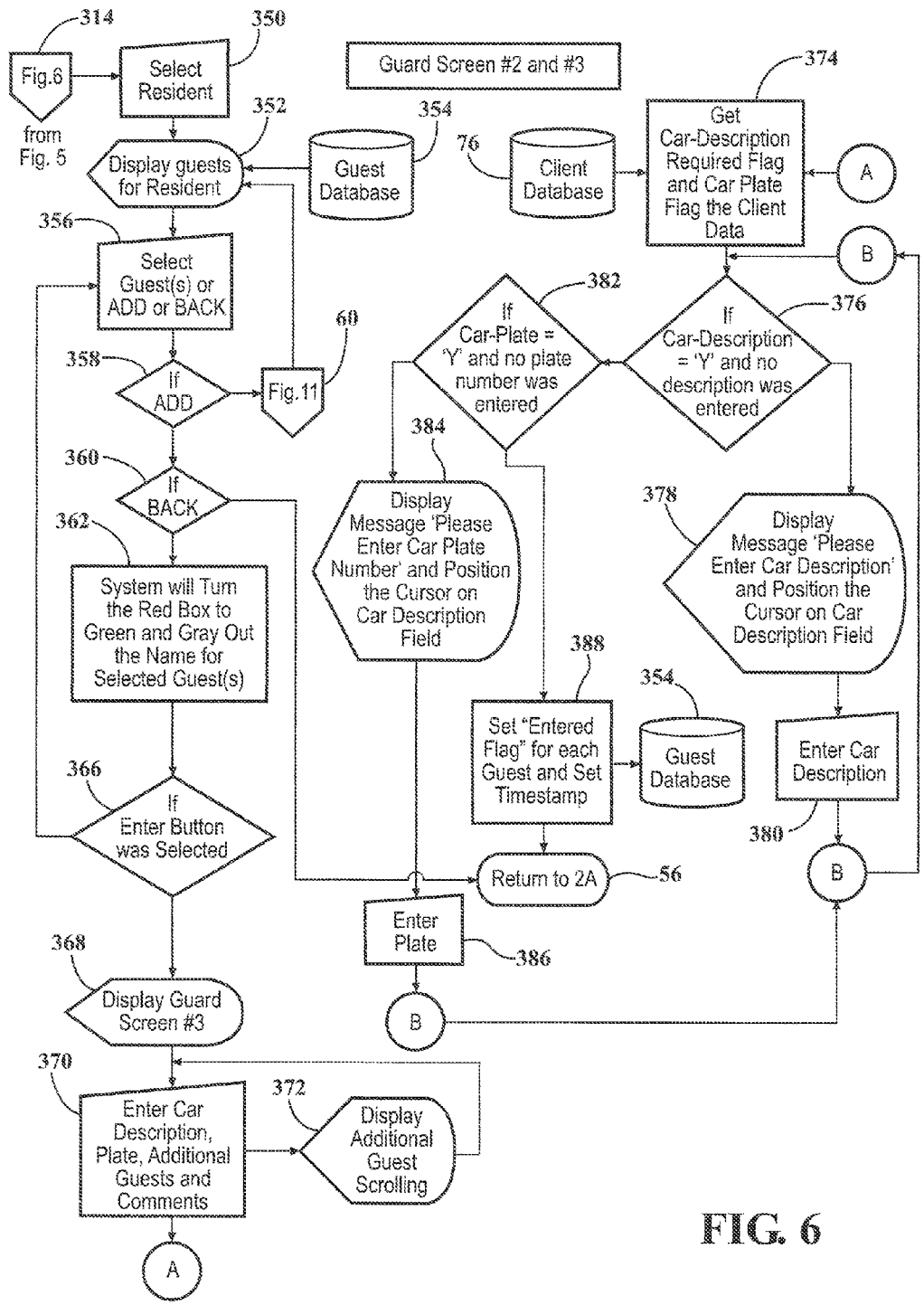

Referring to FIG. 6, the guard search screen continues with the selection of a resident at 350. The guests for a particular resident are displayed at 352. The guests are identified in the guest database 354. The guard then inputs whether to add a guest or go back at 356. If, at 358, a guest is to be added, the method then proceeds to a subroutine for a resident guest entry screen 60, the subroutine for which is found on FIG. 11, which will be discussed in greater detail subsequently. If it is determined a guest is not to be added, it is determined whether the subroutine should to go back at 360. If yes, the subroutine returns to the guest search screen subroutine shown in FIG. 5 at 56.

If the guard determines that they do not want to go back, the system will gray out the selected guest names at 362. If the enter button is not selected, the subroutine loops back at 364 to determine whether more guests are to be selected or to return back to the guest search screen subroutine of FIG. 5. If the selected guests are entered, at 366, a new screen will be displayed at 368. This new screen will allow the guard to enter a car description, license plate number, additional guest and comments at 370. The additional guest information is scrolled at 372.

A car description and car plate number are retrieved from the client database 76 at 374. If the car description flag indicates that the car description was entered at 376, a display message is shown for the guard to enter the car description at 378. The car description is entered at 380. If the car description flag was not entered, it is determined whether the car plate flag was entered and whether the plate number was entered at 382. If it is determined that the car plate number was not entered a message is displayed at 384 to enter the car plate number. The car plate number is entered at 386. The subroutine returns to determine whether the car description flag is set and whether the car plate is identified. If the car plate was entered, the enter flag is set at 388 and that data is entered into the guest database at 354.

Figure 11:
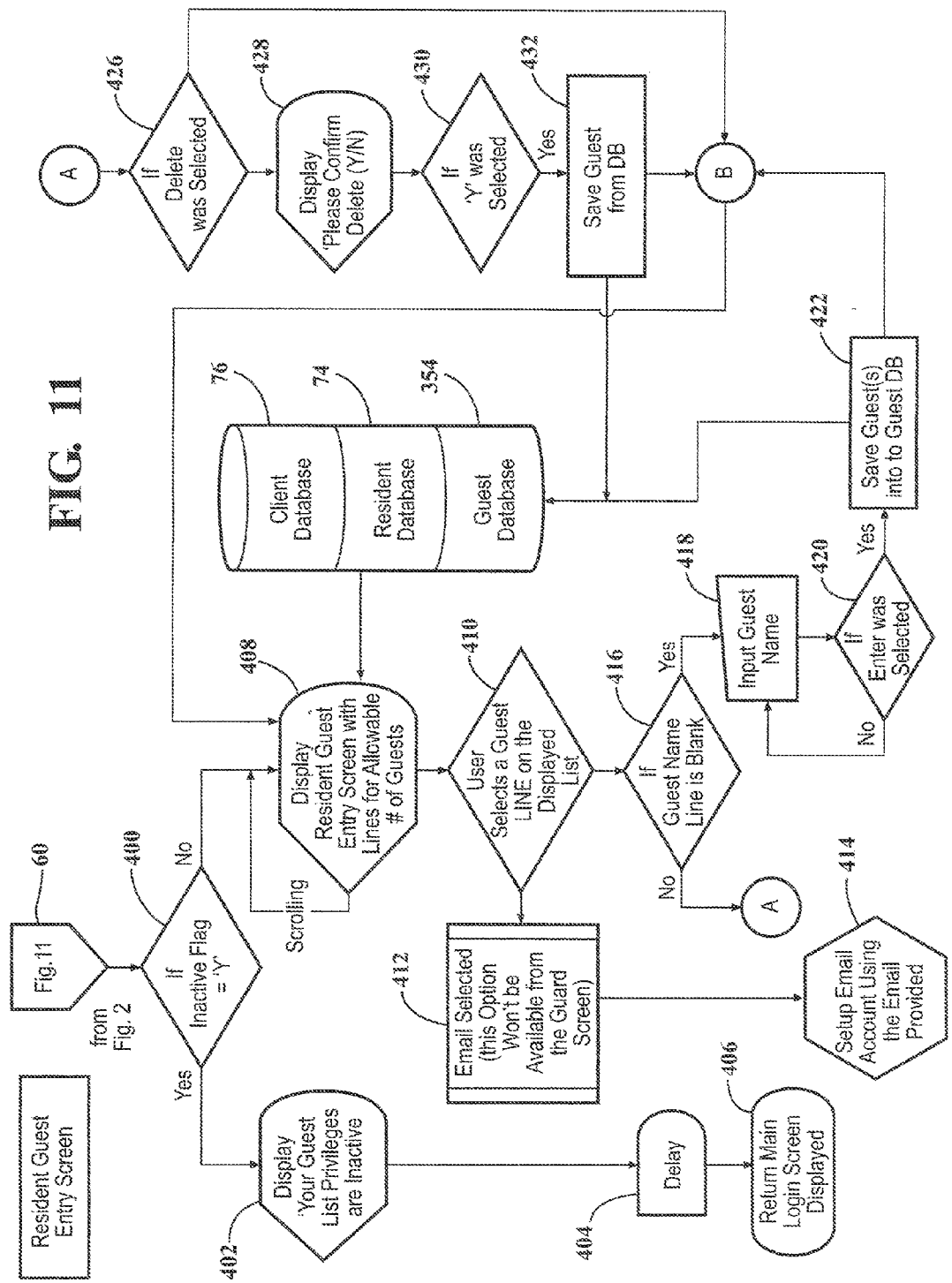

Returning our attention to the determination of whether to add a guest at 356, if the guest is to be added at 358, the subroutine moves to the resident guest entry screen at 60. This subroutine is shown in FIG. 11. The subroutine begins by determining whether an inactive flag is active or not at 400. If the inactive flag is identified as yes, the screen identifying the inactivity of the privileges of the guest are indicated at 402. A delay at 404 is entered and the subroutine returns to the main log in screen display at 406. If the inactive flag is not set, the resident guest entry screen with the number of allowable guests is displayed at 408. This screen is scrolled and receives information from the client database 76, the resident database 74, and the guest database 354.

The guard selects a guest line on the display list at 410 by selecting the email address, which is used as a unique login key for the client 24, employee 18, 24 and resident 22—granting access into the system.

If the guard does select a guest line at 410, it is determined whether the guest name line is blank at 416. If the guest name line is blank, the guest name is input at 418. It is determined whether the enter button was selected at 420. If so, the guest name information is saved at 422 to the guest database 354. If not, the subroutine loops at 424 back to the request for the guest name input at 418.

If the guest name line is not blank, as determined at 416, it is determined whether delete is selected at 426. If delete is not selected, the subroutine returns to display resident guest entry screen with the lines for the allowable number of guests at 408. If delete is selected, a confirmation screen is displayed at 428. If yes is selected at 430, the guest is removed at 432 from the guest database 354. The subroutine then returns to the display resident guest entry screen 408.

Returning our attention to the administration main menu screen of FIG. 4, it is determined whether a monthly report was selected at 132. If so, the method moves to a monthly report screen subroutine at 500. It is determined if the month and year were selected at 502. If not, a message is displayed to select the month and year at 504. The month and year are selected at 506. The monthly report is displayed by the selected month and year at 508. The monthly report retrieves information from the guest database 354, the client database 76 and the resident database 74 to compile the appropriate report.

It is then determined at 510 whether the report is to be printed using a portable document format at 510. If so, the PDF file is saved at 512.

If not, it is determined whether the subroutine should return to the administration main menu at 514. If not, the subroutine loops back at 516 to the monthly report display at 508. If it is determined to return to back to the administration main menu, the subroutine returns to the administration main menu at 518.

Figure 13:
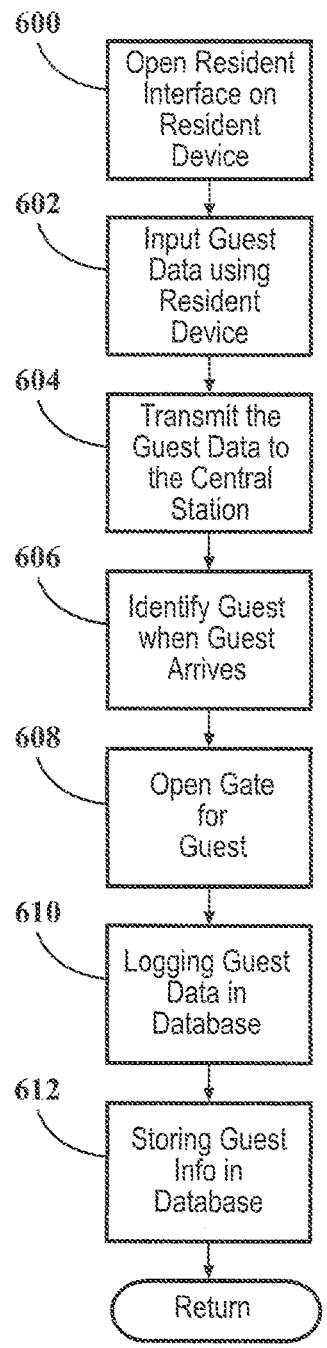

Referring to FIG. 13, the inventive method operates by opening a resident interface on a resident device 26, 28, 30 at 600. The resident 22 inputs guest data using the resident device 26, 28, 30 at 602. That data is sent to the central station 16 at 604. That data remains at the central station 16 until the guest 20 arrives at the automated gate 14. Once the guest 20 arrives, he or she is identified at 606. This can be done by any one of a number of ways to identify a guest 20, either through license plate reading, drivers license scanning, or through having the guest 20 input a random code generated and sent to the guest 20 after his or her data was entered into the system 10. Once the guest 20 is identified as being on the guest registry, the automated gate 14 is opened at 608 allowing the guest 20 to enter the defined space 12. The guest data is logged at 610 and stored at 612. The gate 14 is lowered and the defined space 12 is closed until the next authorized guest 20 approaches the gate 14.

The invention has been described in an illustrative manner. It is to be understood that the terminology, which has been used, is intended to be in the nature of words of description rather than of limitation.

Many modifications and variations of the invention are possible in light of the above teachings. Therefore, within the scope of the appended claims, the invention may be practiced other than as specifically described.

We claim:

1. A method for providing a guest access to a defined space selectively accessible through a gate controlled by a guard, the method comprising the steps of:
    causing a resident interface to be displayed to a resident via a resident data device;
    receiving guest data from the resident about the guest using the resident data device;
    transmitting the guest data to a central station;
    transmitting the guest data from the central station to an attendant for the gate;
    identifying the guest when the guest arrives at the gate by having the guard confirm the guest data;
    receiving information about the guest from the guard to further identify the guest;
    confirming the guest is authorized to enter the defined space;
    opening the gate to allow the guest to travel into the defined space after the gate is opened by the guard.

2. A method as set forth in claim 1 including the step of storing the guest data in a guest database in the resident data device.

3. A method as set forth in claim 2 including logging the guest data in a guest log database in the central station.

4. A method as set forth in claim 1 wherein the information about the guest received by the guard includes a license plate number of a car being used by the guest.

5. A method as set forth in claim 1 wherein the information about the guest received by the guard includes a type of car be used by the guest.

\* \* \* \* \*